(12) United States Patent
Müller et al.

(10) Patent No.: US 12,306,024 B2
(45) Date of Patent: May 20, 2025

(54) SENSOR APPARATUS HAVING AN EMBEDDED OPTICAL INTERROGATOR

(71) Applicant: ROSEN SWISS AG, Stans (CH)

(72) Inventors: Sebastian Müller, Lingen (DE); Marc Baumeister, Münster (DE)

(73) Assignee: Rosen IP AG, Stans (CH)

( * ) Notice: Subject to any disclaimer, the term of this patent is extended or adjusted under 35 U.S.C. 154(b) by 193 days.

(21) Appl. No.: 17/999,412

(22) PCT Filed: May 19, 2021

(86) PCT No.: PCT/EP2021/063360
§ 371 (c)(1),
(2) Date: Nov. 21, 2022

(87) PCT Pub. No.: WO2021/234038
PCT Pub. Date: Nov. 25, 2021

(65) Prior Publication Data
US 2023/0194314 A1 Jun. 22, 2023

(30) Foreign Application Priority Data
May 20, 2020 (DE) .......................... 102020113680.3

(51) Int. Cl.
| G01D 5/353 | (2006.01) |
|---|---|
| F16L 55/40 | (2006.01) |
| F16L 101/12 | (2006.01) |
| G02B 6/12 | (2006.01) |
| G02B 6/42 | (2006.01) |

(52) U.S. Cl.
CPC .............. *G01D 5/353* (2013.01); *F16L 55/40* (2013.01); *G02B 6/42* (2013.01); *F16L 2101/12* (2013.01); *G02B 6/12009* (2013.01)

(58) Field of Classification Search
CPC ..... G01D 5/353; G01D 5/35316; F16L 55/40; F16L 2101/12; G02B 6/42; G02B 6/12009; G02B 6/4215; G02B 6/4298; G02B 6/36
See application file for complete search history.

(56) References Cited

U.S. PATENT DOCUMENTS

| 6,930,820 | B1 | 8/2005 | Shooks, Jr. et al. |
|---|---|---|---|
| 10,120,131 | B2 | 11/2018 | Schade |

(Continued)

FOREIGN PATENT DOCUMENTS

| DE | 102007030025 B3 | 10/2008 |
|---|---|---|
| DE | 102012214440 B3 | 10/2013 |

(Continued)

*Primary Examiner* — Mary Ellen Bowman
*Assistant Examiner* — Carlos Perez-Guzman
(74) *Attorney, Agent, or Firm* — Husch Blackwell LLP

(57) ABSTRACT

A sensor apparatus is provided in which both an optical interrogator and an optical waveguide are embedded in the same component made of fiber-reinforced plastic. The optical interrogator and the optical waveguide thus form a unit with the component made of fiber-reinforced plastic, in which they are embedded. The optical interrogator and the optical waveguide are arranged in this case protected in the same component made of fiber-reinforced plastic. The optical waveguide does not have to be led out of this component and into the interrogator. The risk of damage to the optical waveguide is thus significantly reduced.

14 Claims, 3 Drawing Sheets

(56) References Cited

U.S. PATENT DOCUMENTS

| | | | |
|---|---|---|---|
| 2007/0280605 A1 | 12/2007 | Mendoza | |
| 2012/0321242 A1* | 12/2012 | Schade | G01D 5/35387 |
| | | | 385/12 |
| 2014/0078499 A1* | 3/2014 | Tunheim | G01N 21/31 |
| | | | 356/241.1 |
| 2015/0219848 A1* | 8/2015 | Schade | G02B 6/1225 |
| | | | 156/272.8 |
| 2018/0136017 A1* | 5/2018 | Turner | G01M 11/085 |
| 2021/0381858 A1* | 12/2021 | Lindner | G01D 5/35341 |

FOREIGN PATENT DOCUMENTS

| | | |
|---|---|---|
| DE | 102007048817 B4 | 6/2016 |
| DE | 102018101608 A1 | 7/2019 |
| EP | 3144633 B1 | 4/2018 |
| EP | 3527868 A2 | 8/2019 |
| FR | 3080864 A1 | 11/2019 |
| WO | 9325866 A1 | 12/1993 |
| WO | 2017190063 A2 | 11/2017 |

\* cited by examiner

SENSOR APPARATUS HAVING AN EMBEDDED OPTICAL INTERROGATOR

CROSS REFERENCE

This application claims priority to PCT Application No. PCT/EP2021/063360, filed May 19, 2021, which itself claims priority to German Patent Application No. 10 2020 113680.3, filed May 20, 2020, the entireties of both of which are hereby incorporated by reference.

FIELD OF THE INVENTION

The present invention relates to a sensor apparatus comprising at least one optical interrogator and at least one optical waveguide, which is connected to the optical interrogator and has at least one fiber Bragg grating at least in sections, wherein the optical interrogator has at least one integrated optical circuit.

BACKGROUND OF THE INVENTION

Sensor apparatuses having an optical waveguide which has at least one fiber Bragg grating at least in sections are known in the prior art. The fiber Bragg grating is preferably inscribed in the optical waveguide for this purpose. Such optical waveguides having fiber Bragg grating are used together with an optical interrogator. The fiber Bragg grating in the optical waveguide forms a sensor in this case, via which temperature changes and/or elongations of a component can be measured. For this purpose, the optical waveguide is introduced on or in a component to be monitored. The optical interrogator of such a sensor apparatus can be placed remotely from the sensor, the fiber Bragg grating in the optical waveguide, in this case. The optical waveguide is connected to the optical interrogator. The distance between the sensor and the optical interrogator can be up to several kilometers here.

Presently, an optical interrogator is typically a comparatively voluminous apparatus which is placed, for example, on a laboratory table or is installed in an insert or a housing for mounting in a 19-inch rack. However, comparatively compact optical interrogators are also known. These optical interrogators usually have at least one integrated optical circuit (photonic integrated circuit). Such a system having an optical interrogator which has an integrated optical circuit in the form of an arrayed waveguide grating (AWG) is disclosed, for example, in EP 3 144 633 B1.

BRIEF SUMMARY OF THE INVENTION

The object of the present invention is to provide a sensor apparatus based on an optical interrogator and an optical waveguide having at least one fiber Bragg grating, which is suitable for mobile and/or long-term to permanent use. Furthermore, it is the object of the present invention to provide a pig for pipelines, in particular in the form of a cleaning and/or inspection pig, having a sensor apparatus according to the invention, and an intelligent repair patch having a sensor apparatus according to the invention.

This object is achieved in that in a sensor apparatus according to the invention, both the optical interrogator and the optical waveguide are embedded in the same component made of fiber-reinforced plastic. The optical interrogator and the optical waveguide thus form a unit with the component made of fiber-reinforced plastic, in which they are embedded. The optical interrogator and the optical waveguide are arranged in this case protected in the same component made of fiber-reinforced plastic. The optical waveguide does not have to be led out of this component and into the interrogator. The risk of damage to the optical waveguide is thus significantly reduced. This enables a mobile use of the sensor apparatus, since the interrogator is not placed in a stationary manner on a laboratory table or in a 19-inch rack but rather is part of the same component which also has the at least one sensor. The sensor apparatus is thus also suitable for long-term to permanent use, since the optical waveguide does not have to be led out of the component to the optical interrogator and is protected from damage. A long-term use in this case is a use of at least several weeks to several months. A permanent use means a use on the same structure to be monitored during the lifetime of the structure or the sensor apparatus, in particular of the optical interrogator, depending on which lifetime ends earlier.

The embedding of the optical interrogator in the component made of fiber-reinforced plastic is enabled in that an optical interrogator having at least one integrated optical circuit can be constructed significantly more compactly than the optical interrogators typically employed for laboratory use.

The sensor apparatus and/or the optical interrogator is electrically connected to a control unit. The control unit has in this case elements for actuating the optical interrogator and for electronic data processing of data coming from the optical interrogator. The control unit can be arranged externally, i.e., outside the component made of fiber-reinforced plastic, in which the optical interrogator and the optical waveguide are embedded. Leading electrical contacts out of the component and the electrical connections to the control unit is possible more easily and with greater design freedom than leading out of an optical waveguide. Thus, sharp angles, for example, 90° angles, can be implemented in the case of electrical contacts, while minimum bending radii have to be taken into consideration when guiding an optical waveguide to avoid kinking of the optical waveguide and accompanying damage of the light-guiding fiber. The control unit is preferably arranged internally, i.e., also embedded in the same component made of fiber-reinforced plastic as the optical interrogator and the optical waveguide. Furthermore, the control unit is particularly preferably formed by an integrated electrical circuit of the interrogator. The optical interrogator can be implemented for this purpose as an optoelectronic integrated circuit (OEIC). In this way, a particularly compact optical interrogator can be created, which can be embedded particularly easily in the component made of fiber-reinforced plastic.

Furthermore, the sensor apparatus and/or the optical interrogator particularly preferably has communication means for wireless communication, an energy storage device, in particular an accumulator, and/or means for wireless energy supply. In this way, the required electrical contacts to the outside can be further reduced. The sensor apparatus preferably does not require any electrical contacts to the outside, by which the reliability of the sensor apparatus is increased. The sensor unit can transmit the measurement data in this case directly via the communication means to an external receiver and/or can have a data memory for (temporary) storage of the measurement data, which is read out at a later point in time.

The dimensions of the optical interrogator are preferably smaller than 2 cm×7.5 cm×1 cm. An optical interrogator having such small dimensions can be embedded particularly easily in a component made of fiber-reinforced plastic. A component is to be understood in this case as a component made of a fiber-reinforced plastic or also as a section of a component formed from a fiber-reinforced plastic which can also have sections formed from materials other than fiber-reinforced plastic.

The optical interrogator preferably does not have an optical circulator. An optical circulator is used to protect a light source of the optical interrogator from the light reflected at a fiber Bragg grating, in that it does not conduct the reflected light back to the light source but rather to an evaluation unit of the optical interrogator. Optical circulators are comparatively large components which set limits on miniaturization of an optical interrogator in particular with their longitudinal dimension. An optical interrogator without optical circulator, in contrast, can be implemented in a smaller installation space. Such an optical interrogator can as a result be embedded more easily in the component made of fiber-reinforced plastic.

The optical interrogator preferably has an ASE (Amplified Spontaneous Emission) light source. Such an ASE light source comprises an optical waveguide. Light can pass through this waveguide in both directions. It is thus possible to provide an optical interrogator which dispenses with an optical circulator for protecting the light source. The optical interrogator particularly preferably has an ASE light source to which the optical waveguide is connected. The ASE light source emits light into the optical waveguide. At least a part of the light is reflected at a fiber Bragg grating of the optical waveguide, runs through the ASE light source again, and is deflected by an integrated optical circuit arranged on the other side of the ASE light source, for example, an arrayed waveguide grating, onto a photodiode associated with the wavelength of the reflected light. Such an optical interrogator preferably comprises the optical components of the ASE light source, the arrayed waveguide grating, and photodiodes which are associated with specific sections of the arrayed waveguide grating. The optical interrogator particularly preferably does not have any further optical components. A particularly compact optical interrogator can be implemented in this way, which can be embedded particularly easily in a component made of fiber-reinforced plastic.

The optical interrogator is preferably formed without a cooling element for temperature regulation. An optical interrogator which has an integrated optical circuit is sensitive with respect to temperature changes, in particular with respect to changes of distances within the integrated optical circuit thus induced. To obtain reliable results, the temperature of an optical interrogator is precisely regulated, sometimes in the range of a few mK. Peltier elements are typically used for this purpose, which can be used both for heating and cooling the optical interrogator, thus form a cooling element. In particular the cooling of the optical interrogator via such a Peltier element is very energy intensive. A high energy consumption is not conducive, however, to mobile and/or longer-term to permanent use. In the refinement according to the invention, the optical interrogator of the sensor apparatus accordingly does not have a cooling element for temperature regulation. Dispensing with a cooling element is made possible preferably in that the optical interrogator is designed for an operating temperature which is higher than the temperatures to which the optical interrogator is subjected in use. If the sensor apparatus is used in an environment in which the temperatures do not exceed 30° C., for example, the interrogator can be designed for an operating temperature of 40° C., for example. A temperature regulation can only take place in this case by heating. The interrogator can be heated in this case by a heating resistor. Cooling and a corresponding cooling element can thus be omitted. The structure of such an interrogator is simpler due to dispensing with cooling, for example by a Peltier element. A simple heating resistor is constructed more simply and cost-effectively than a cooling element formed as a Peltier element, for example. The energy consumption is reduced by omitting the cooling.

Alternatively, the sensor apparatus is preferably formed without temperature regulation. The optical interrogator has neither a cooling element nor a heating element in this case. The temperature of the optical interrogator itself therefore cannot be regulated. Such a design is conceivable for sensor apparatuses which are used in an environment having a known and sufficiently uniform temperature. One example of such an environment is a use in the interior of a fluid-filled pipeline. The temperature of the fluid is known in this case and is only subjected to minor changes. The optical interrogator can thus be designed for the known temperature. Preferably, a continuous, but at least regular measurement of the temperature takes place during the use of the sensor apparatus, for example, in the interior of a fluid-filled pipeline. The measured values recorded by the sensor apparatus are subjected in a processing of the measurement data following a measurement using the sensor apparatus to a temperature compensation using the measured temperature values, in which the measured values are adapted in the event of possible temperature changes.

Furthermore, a pig for pipelines, in particular in the form of a cleaning or inspection pig, having at least one inspection apparatus having a plurality of sensor arms, which is provided in particular for measuring a geometry or condition of the pipeline, wherein the inspection apparatus has at least one sensor apparatus according to the invention, is the subject matter of the invention. The sensor apparatus according to the invention is particularly well suitable for the use on such an inspection pig. In the sensor apparatus according to the invention, the optical waveguide and the optical interrogator are embedded in a component made of fiber-reinforced plastic. Only one or more electrical contacts are to be provided, for example, for the energy supply and/or the transmission of measurement data. The optical interrogator has sufficiently small dimensions in this case that it can be embedded in a component made of fiber-reinforced plastic. The sensor apparatus is thus comparatively compact and can therefore be arranged easily on a pig. Because the optical interrogator and the optical waveguide are embedded in the same component, the optical waveguide is continuously protected. The risk that the optical waveguide will be kinked or damaged in another way during a run of the pig through a pipeline is very low.

If damage to the sensor apparatus nonetheless occurs, it can be replaced easily, since it is a uniform assembly. A new sensor apparatus solely has to be connected optionally to the electrical contacts of the pig if such contacts are provided. Connecting optical components, with the required accurate alignments of the optical components, is not necessary.

The sensor apparatus preferably has an energy storage device, in particular a battery or an accumulator, or is embedded jointly with an energy storage device in the component made of fiber-reinforced plastic. The sensor apparatus has a communication means for a wireless communication, in particular WLAN or Bluetooth, or is embedded jointly with a communication means for wireless communication in the component made of fiber-reinforced plastic. In such a preferred embodiment, all electrical connections relevant for the operation are also embedded inside the component made of fiber-reinforced plastic and thus protected from damage. There are no cables which are led out of the component made of fiber-reinforced plastic in the operation of the pig. If an energy storage device designed as an accumulator has means for wireless charging, contacts or cables leading outward for the replacement or charging of the energy storage device can also be omitted. The measurement data recorded by the sensor apparatus can be transmitted wirelessly in this case by means of the communication means to a receiver arranged on or in the pig and can be stored in a data memory arranged on or in the pig. Alternatively or additionally, the sensor apparatus can have a data memory for storing the measurement data or can be embedded together with such a data memory in the component made of fiber-reinforced plastic. The data memory is then read out outside a pipeline, in particular wirelessly, after a measurement run.

The sensor apparatus preferably at least concomitantly forms a sensor arm or a sensor disk of the inspection apparatus. Such a sensor arm can be formed, for example, by a component formed from fiber-reinforced plastic or can have at least one such component, in which the optical waveguide and the optical interrogator are embedded. The sensor apparatus is thus contained in the sensor arm or sensor disk and can be fixed easily on the pig.

The optical waveguide of the sensor apparatus is arranged extending in the sensor arm or the sensor disk and is designed for measuring the curvature of the sensor arm or the sensor disk. In this case, the sensor arm or the sensor disk can be formed completely by the component made of fiber-reinforced plastic, in which the optical waveguide and the optical interrogator are embedded. Alternatively, the component can also be applied to a further component, which (concomitantly) forms the sensor arm or the sensor disk. A curvature of the sensor arm or the sensor disk results in an elongation of the optical waveguide, which can be registered at the at least one point at which a fiber Bragg grating is introduced into the optical waveguide. A curvature of the sensor arm or the sensor disk can thus be established. The geometry of the pipeline through which a corresponding pig is guided can be inferred therefrom. Particularly preferably, each arm of the inspection apparatus has at least one sensor apparatus according to the invention. An inspection apparatus having one or more such sensor apparatuses can be implemented easily and preferably having a low weight.

The pig preferably has multiple sensor apparatuses. During an inspection run, measurements can therefore be carried out by the other sensor apparatus(es) even in the event of damage or failure of one sensor apparatus. The pig is thus usable more reliably.

Furthermore, an intelligent repair patch, formed by the application of a fiber-reinforced plastic material to a point of a structure to be repaired, in particular a pipeline, wherein the repair patch has and/or forms at least one sensor apparatus according to the invention, is the subject matter of the invention. Using such an intelligent repair patch, which has a sensor apparatus according to the invention, for example, elongations or the temperature of the intelligent repair patch can be detected. Such an intelligent repair patch can be attached, for example, as a sleeve around a damaged point of a pipeline. Such an intelligent repair patch formed as a sleeve can preferably also indirectly register a penetration of a fluid into the repair patch and thus a detachment from the pipeline, leaks and/or movements of the pipeline, for example, as a result of landslides or the attachment of illegal removal points. The sensor apparatus of the intelligent repair patch thus enables not only monitoring of the status of the repair patch and the point of a structure repaired using this patch, but also the monitoring of sections of the structure adjoining the intelligent repair patch, in the case of natural frequency monitoring also of larger sections of the structure or the structure in its entirety. Such natural frequency monitoring by an intelligent repair patch is advantageous in particular for wind turbines and of foundations for offshore structures such as offshore wind turbines, for example, in the form of monopiles. Within such an intelligent repair patch, the sensor apparatus is provided for long-term to permanent use. Permanent in this case means a use up to the end of the lifetime of the intelligent repair patch.

The intelligent repair patch preferably has a communication means for transmitting measured values. The communication means is particularly preferably configured for wireless communication. The measurement data can hereby be transmitted from the intelligent repair patch, for example, to a central data collection point and centrally evaluated. The communication means is particularly preferably part of the optical interrogator of the sensor apparatus. The communication means is particularly advantageously formed as a component of the optoelectronic integrated circuit of the optical interrogator. In this way, a sensor apparatus having a corresponding communication means can be implemented in a particularly simple and compact manner.

The intelligent repair patch preferably has an energy source, in particular a battery. The energy source is preferably arranged in the sensor apparatus, particularly preferably in the optical interrogator. In particular in combination with a wireless communication means, the intelligent repair patch having an energy source can be installed particularly easily. Wiring for the energy supply and/or the communication can be omitted.

Furthermore, a system, comprising multiple of the above-mentioned intelligent repair patches, which have a communication connection to one another and/or to a data acquisition unit and form a sensor network for monitoring the structure provided with the intelligent repair patches, is the subject matter of the invention. Such intelligent repair patches can be attached to multiple points of a structure, for example, to multiple sections of a pipeline. Because in this way measurement data of the intelligent repair patches are available from multiple points of the structure, a more accurate image of the status of the structure or the individual repair patches can be obtained. The repair patches preferably have a wireless communication connection to one another and/or to a central data acquisition unit. The data can be evaluated in this case in a monitoring unit. The individual intelligent repair patches preferably form a sensor and communication network. The data of further intelligent repair patches can be incorporated in this case in the evaluation of data of an intelligent repair patch. It can thus be recognized particularly easily in the case of a pipeline, for example, whether the measured events are to be attributed, for example, to a movement of the pipeline as a result of a landslide or to drilling in to illegally remove fluid from the pipeline.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Identically or similarly acting parts are, if appropriate, provided with identical reference signs. Individual technical features of the exemplary embodiments described hereinafter can be combined with the feature of individual above-described exemplary embodiments to form subjects according to the invention.

Figure 1:
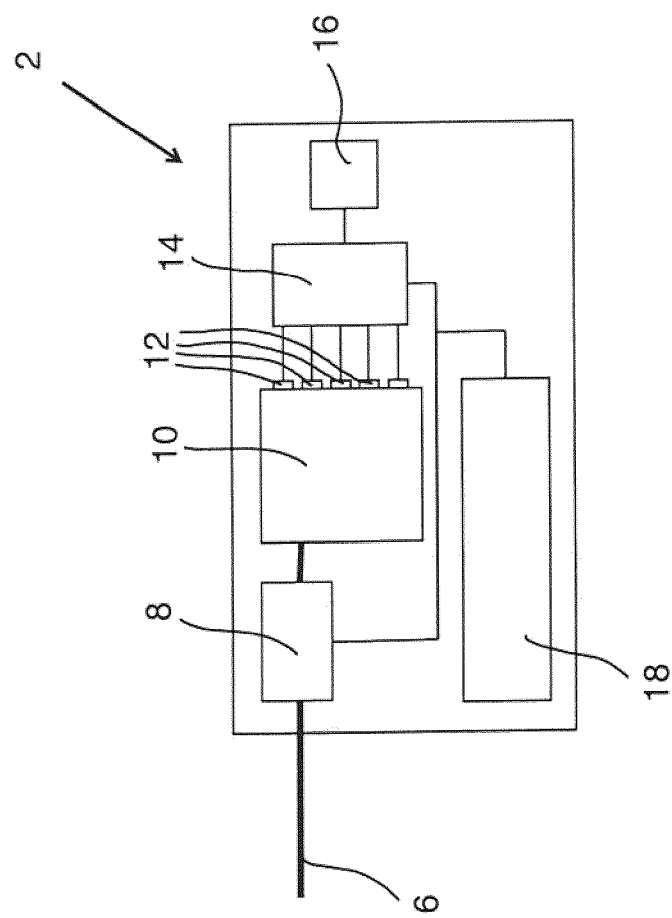
FIG. 1 shows an exemplary embodiment of an optical interrogator for use in a sensor apparatus according to the invention.

FIG. 1 shows an optical interrogator 4 for use in a sensor apparatus 2 according to the invention. The optical interrogator 4 is connected to an optical waveguide 6, which has at least one fiber Bragg grating at least in sections. The optical waveguide is connected to an ASE light source 8. Light emitted by the ASE light source 8 is transmitted in the optical waveguide 6. Possible light reflected on a fiber Bragg grating of the optical waveguide 6 passes through the ASE light source 8 in the opposite direction and reaches an arrayed waveguide grading (AWG) formed as an integrated optical circuit 10. The light passing through the arrayed waveguide grading is deflected in dependence on its wavelength onto specific photodiodes 12. The photodiodes 12 measure the intensity of the incident light. The position of the photodiodes 12 corresponds in this case to a specific wavelength of the light. The photodiodes 12 are electrically connected to a control unit 14. The optical interrogator 4 is controlled and the electrical signals generated by the photodiodes 12 are recorded via the control unit 14.

The optical interrogator 4 according to the exemplary embodiment according to FIG. 1 has as further otherwise optional elements a communication means 16 for wireless communication and an energy source 18, via which the optical interrogator can be supplied with energy. The optical interrogator 4 in the exemplary embodiment according to FIG. 1 does not require external electrical contacts for inputs or outputs. However, the optical interrogator can also be formed without integrated communication means 16 and/or without an integrated energy source 18. In these cases, electrical contacts are to be provided for energy and/or data transmission. The optical interrogator 4 does not have temperature regulation in the exemplary embodiment according to FIG. 1.

Figure 2:
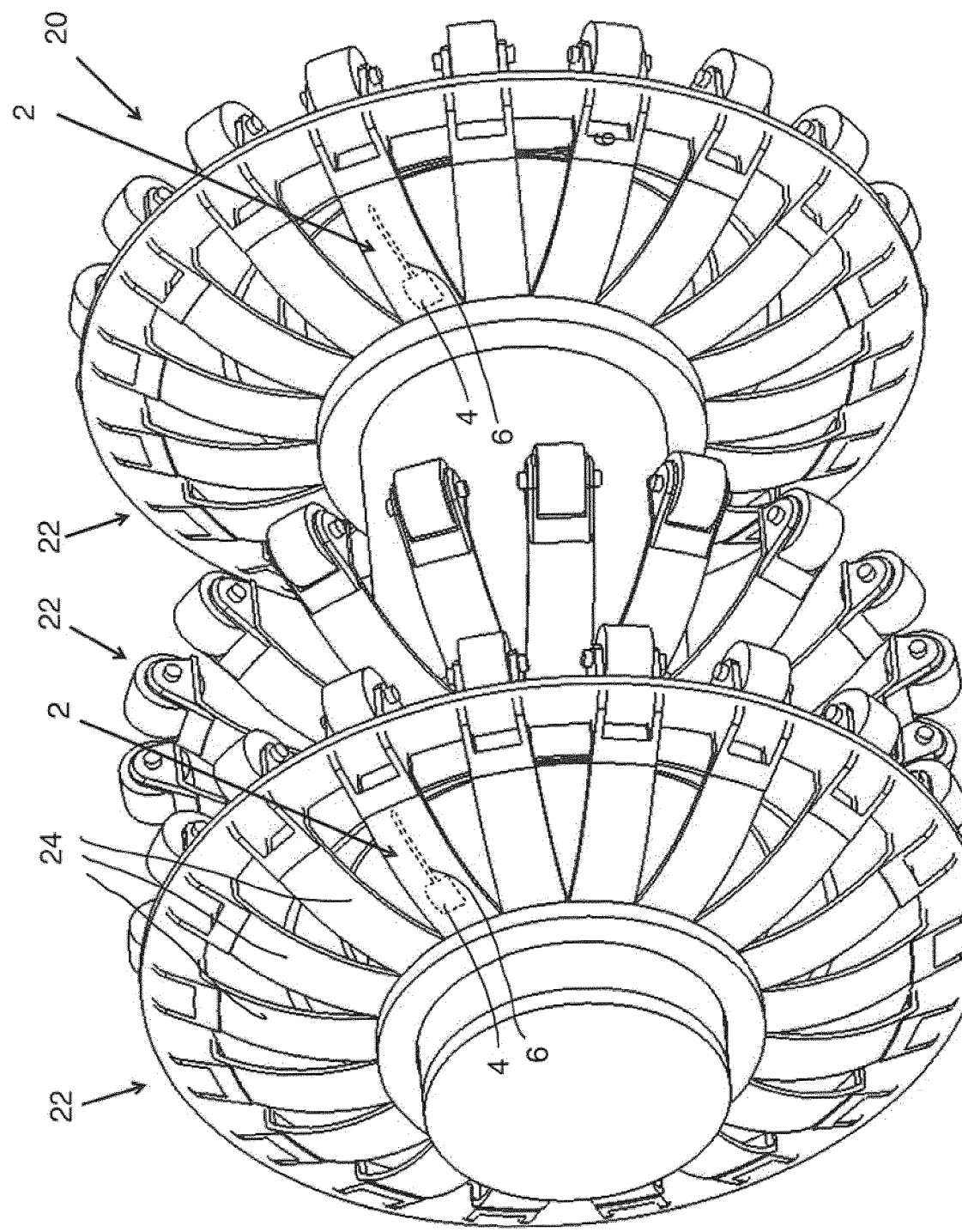
FIG. 2 shows an inspection pig having a sensor apparatus according to the invention.

FIG. 2 shows a pig 20 for pipelines having three inspection apparatuses 22, which are spaced apart from one another and have a plurality of sensor arms 24. The inspection apparatuses 22 having the sensor arms 24 are designed for measuring the geometry or condition of a pipeline. The sensor arms 24 are formed in this case as sensor apparatuses 2 according to the invention. They are formed as components made of fiber-reinforced plastic, in each of which an optical interrogator 4 and an optical waveguide 6 are embedded.

Figure 3:
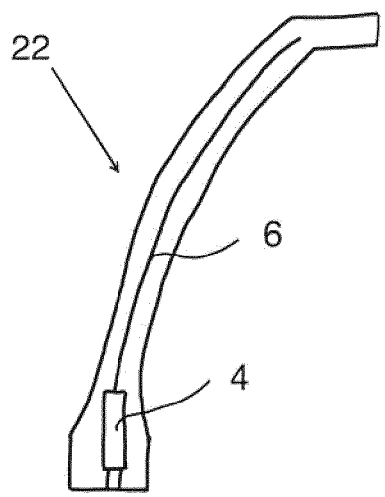
FIG. 3 shows a cross section through a sensor arm of the inspection apparatus of the inspection pig according to FIG. 2.

FIG. 3 shows a cross section through a corresponding sensor arm 24 of an inspection apparatus 12 of the pig 20 from FIG. 2 having the optical interrogator 4 and the optical waveguide 6, which are embedded in the sensor arm 24 consisting of a fiber-reinforced plastic. The sensor arm 24 does not have to consist completely of fiber-reinforced plastic in this case. It is also conceivable to use a sensor arm made of, for example, a metallic material, on which a component formed from fiber-reinforced plastic is applied at least in sections. The sensor arms 24 are flexible, wherein the bending of a sensor arm 24 results in elongations in the material of the sensor arm 24. These elongations can be registered via the fiber Bragg grating sensors of the sensor apparatuses 2, which are arranged in the respective sensor arm 24. During a run of an inspection pig according to the invention having sensor apparatuses 2 according to the invention through a pipeline, the internal geometry of the inspected pipeline can therefore be inferred from the deformations of the individual sensor arms 24 of the inspection apparatuses 22.

Figure 4:
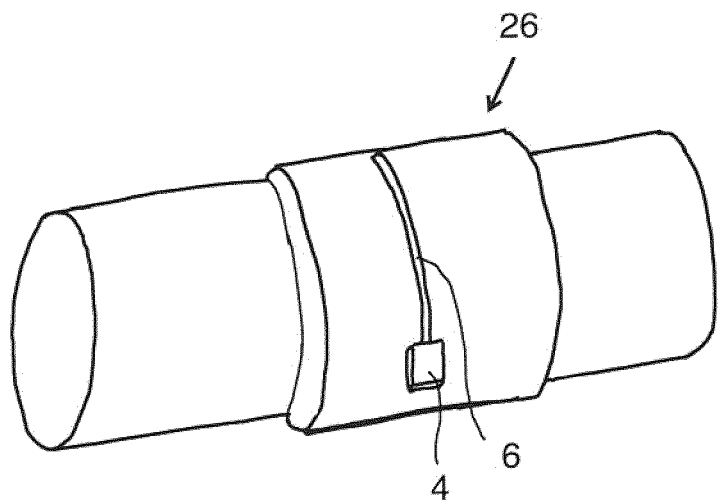
FIG. 4 shows an intelligent repair patch having a sensor apparatus according to the invention.

FIG. 4 shows an intelligent repair patch 26, which forms a sensor apparatus 2 according to the invention. The intelligent repair patch is formed for this purpose from a fiber-reinforced plastic, in which an optical interrogator 4 and an optical waveguide 6 connected to the optical interrogator 4 are embedded. In the exemplary embodiment according to FIG. 4, the intelligent repair patch 26 is formed as a sleeve made of a fiber-reinforced plastic material around a pipeline. It is also in the scope of the invention to attach such an intelligent repair patch 26 to support structures of offshore wind turbines, for example, a monopile. The intelligent repair patch 26 in this case preferably has an optical interrogator 4 according to the exemplary embodiment according to FIG. 1. In particular, the optical interrogator 4 for use in an intelligent repair patch 26 has communication means 16 for wireless communication and an energy source 18 for the energy supply of the optical interrogator 4. An optical interrogator 4 designed in this way can be embedded particularly easily therein during the creation of an intelligent repair patch 26. An intelligent repair patch 26 is formed in that a fiber-reinforced plastic material is applied to a point of a structure to be repaired, in the present case a pipeline. During the application of the intelligent repair patch 26, an optical interrogator 4 and an optical waveguide 6 are embedded in the fiber-reinforced plastic material of the intelligent repair patch.

Figure 5:
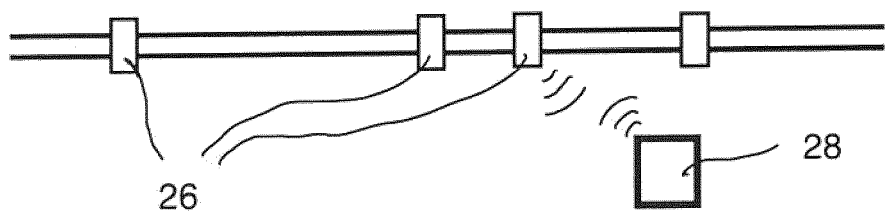
FIG. 5 shows a system comprising multiple intelligent repair patches according to FIG. 4 and a data acquisition unit.

FIG. 5 shows a pipeline having multiple intelligent repair patches 26, which have a wireless data communication connection to one another and to a data acquisition unit 28. The intelligent repair patches 26 and the data acquisition unit 28 form a sensor network for monitoring the structure provided with the intelligent repair patches 26, in the present case the pipeline. The use of such a sensor network enables the monitoring of extensive sections of the structure provided with the corresponding intelligent repair patches 26. The data obtained by individual intelligent repair patches 26 can be evaluated jointly with the data obtained by other intelligent repair patches 26, which are arranged on the same structure at other points. In this way, a more accurate evaluation of the status of the individual intelligent repair patches 26 and/or the structure is enabled.

The invention claimed is:

1. A sensor apparatus comprising:
   a component made of fiber-reinforced plastic;
   at least one optical interrogator having at least one integrated optical circuit; and
   at least one optical waveguide connected to the optical interrogator, the at least one optical waveguide having at least one fiber Bragg grating at least in sections,
   wherein both the optical interrogator and the optical waveguide are embedded in the component made of fiber-reinforced plastic.

2. The sensor apparatus as claimed in claim 1, wherein the optical interrogator does not have an optical circulator.

3. The sensor apparatus as claimed in claim 1 wherein the optical interrogator has an amplified spontaneous emission (ASE) light source.

4. The sensor apparatus as claimed in claim 1, wherein the optical interrogator is formed without a cooling element for temperature regulation.

5. The sensor apparatus as claimed in claim 1, wherein the optical interrogator is formed without temperature regulation.

6. A pig for pipelines comprising:
at least one inspection apparatus having a plurality of sensor arms and having at least one sensor apparatus as claimed in claim 1.

7. The pig as claimed in claim 6, wherein the sensor apparatus at least partially forms a sensor arm or a sensor disk of the inspection apparatus.

8. The pig as claimed claim 6, wherein, each sensor arm of the inspection apparatus has at least one sensor apparatus as claimed in claim 1.

9. An intelligent repair patch, formed by the application of a fiber-reinforced plastic material to a point of a structure to be repaired, wherein the repair patch has and/or forms at least one sensor apparatus as claimed in claim 1.

10. The intelligent repair patch claimed in claim 9, wherein the intelligent repair patch has a communication means for transmitting measured values.

11. The intelligent repair patch claimed in claim 10, wherein the communication means is configured for wireless communication.

12. The intelligent repair patch as claimed in claim 10, wherein the communication means is part of the optical interrogator of the sensor apparatus.

13. The intelligent repair patch as claimed in claim 9, wherein the intelligent repair patch has an energy source.

14. A system, comprising multiple intelligent repair patches as claimed in claim 10, said multiple intelligent repair patches having a communication connection to one another and/or to a data acquisition unit and form a sensor network for monitoring the structure provided with the intelligent repair patches.

* * * * *